3,109,037
SYNTHESIS OF ISOPROPYL BENZENE
Albert J. Shmidl, Crosby, and Jack G. Hester, Baytown, Tex., assignors, by mesne assignments, to Esso Research and Engineering Company, Elizabeth, N.J., a corporation of Delaware
Filed June 6, 1960, Ser. No. 34,169
9 Claims. (Cl. 260—671)

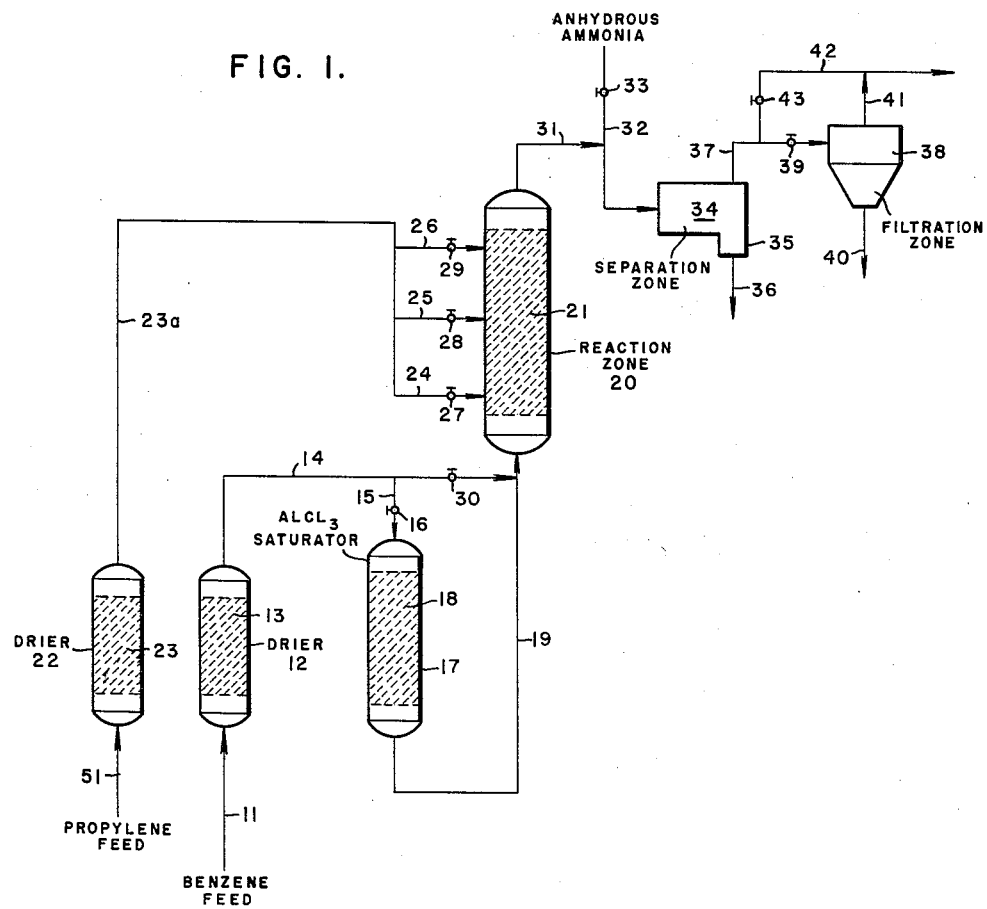

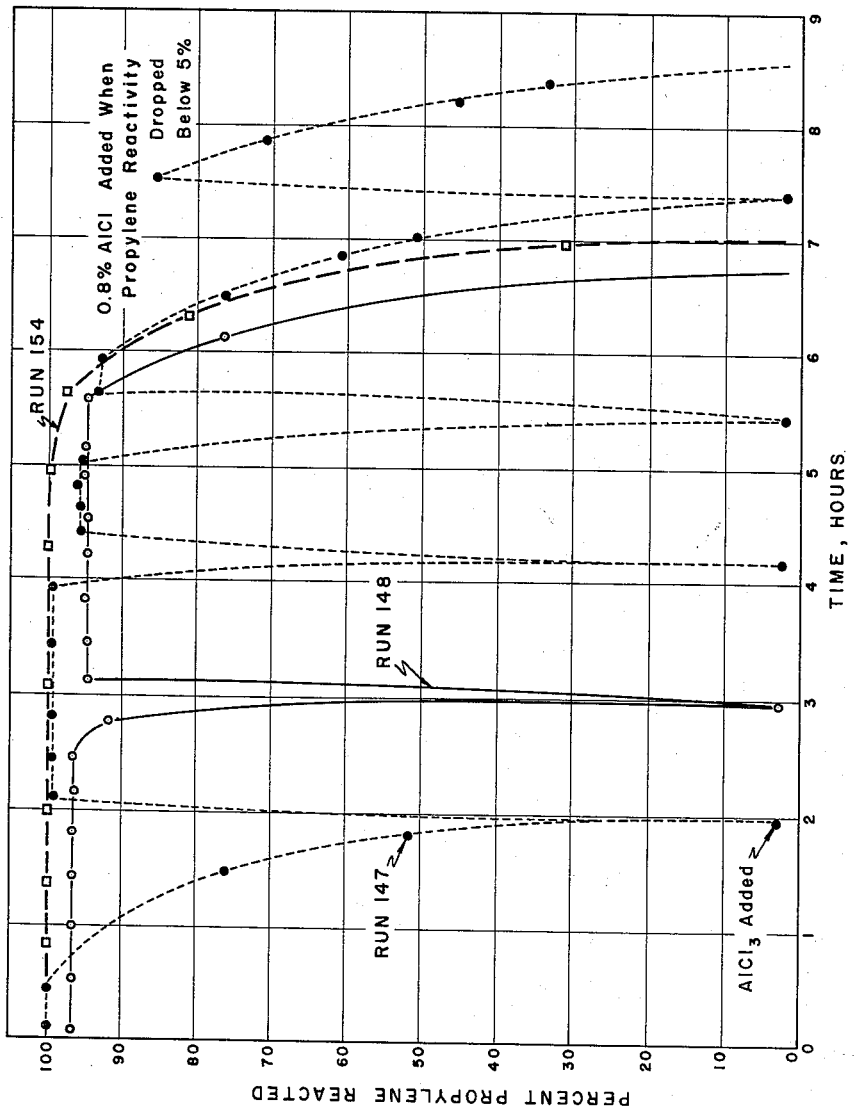

The present invention is directed to the production of isopropyl benzenes, particularly the production of mono-isopropyl benzene, diisopropyl benzene, triisopropyl benzene, and tetraisopropyl benzene. More particularly, the invention is concerned with the production of isopropyl benzenes employing aluminum chloride as a catalyst. In its more specific aspects, the invention is concerned with the production of isopropyl benzenes using an aluminum chloride catalyst where degradation of catalyst is minimized and suppressed.

Aluminum chloride has been used as a catalyst in alkylation of aromatics with olefins. In general, it has been the prior practice in employing aluminum chloride to employ a promoter such as anhydrous hydrogen chloride or alkyl halide with a large amount of anhydrous aluminum chloride. Thus, the amount of catalyst employed has varied between 5 and 10 percent by weight based on the benzene or aromatic hydrocarbon and this quantity has been found to produce considerable cracking, sludge formation, dehydrogenation, and other undesirable reactions.

An improved process for alkylation of benzene or isopropyl benzene with propylenes has been devised in the presence of anhydrous aluminum chloride catalyst to obtain the several isopropyl benzenes. In this operation, commercial benzene or isopropyl benzene is alkylated with a propylene fraction which may contain from 50 to 100 percent by volume of propylene. In the practice of the present invention, it has been discovered that it is essential to remove substantially all of the moisture from both the propylene and the aromatic hydrocarbon such as benzene or isopropyl benzene in order that catalyst requirements may be reduced and such that little, if any, degradation by catalyst will be experienced. In the practice of the present invention, the olefin and aromatic feed stocks are suitably dried such as by passing the feed stocks through a calcium chloride or other type of drier to reduce the water content to below 15 p.p.m., preferably between 5 to 15 p.p.m. Propylene at its saturation point under ambient conditions may contain up to 500 p.p.m. of water while aromatic hydrocarbon such as benzene may contain from about 30 to 60 p.p.m. of water. These amounts of water are sufficient to deactivate a large quantity of catalyst for the desired alkylation reaction.

In order to obtain the aluminum chloride concentrations necessary in the practice of the present invention within the range from about 0.1 to about 0.5 percent by weight of aromatic hydrocarbon, a saturation technique is employed to obtain these concentrations. For example, dried benzene is suitably passed through saturation towers filled with anhydrous aluminum chloride at a controlled temperature and rate so that the desired amount of aluminum chloride may be dissolved in the benzene. For example, a saturation temperature of 160° F. at a space velocity of about 2.0 v./v./hr. is employed to obtain between 0.25 and 0.45 weight percent of aluminum chloride in benzene. Saturation temperatures in the range from about 60° to about 200° F. may be employed at a space velocity in the range from about 0.5 to 5.0 v./v./hr. The solution of anhydrous aluminum chloride in benzene is then charged into a suitable reaction zone such as a stirred reactor, a packed tower, or other suitable type of incorporator or mixing device and the dried propylene either in the gaseous or liquid phase is then added to the solution under alkylation reaction conditions which may include a temperature in the range from about 50° to about 200° F. with a ratio of propylene to aromatic hydrocarbon in the range from about 1.0 to about 4.0 mols of propylene per mol of aromatic hydrocarbon. It is desirable that the propylene be added to the reaction zone at spaced-apart points and at such a rate that overheating is not experienced. When a considerable amount of alkylation is obtained, it may be necessary to remove part of the products of reaction and cool them and return them to the reaction zone in a cooled condition in order to maintain the temperature within the desired range.

It is a particular feature of the present invention to conduct the reaction in a once-through manner employing the stated amount of catalyst and with no sludge or catalyst recycle. In short, in the present invention, no sludge is formed and the catalyst is not recycled since the catalyst remains in solution in the product. The alkylated product may contain a small amount of hydrogen chloride, dissolved aluminum chloride, and soluble aluminum chloride complex, which does not discolor the product.

It is desirable to neutralize the product with anhydrous ammonia since anhydrous ammonia effectively reacts with the aluminum chloride and with any complex or hydrogen chloride in solution in the product. The reaction product of anhydrous ammonia and the aluminum chloride reaction products are easily separated by decantation or by filtering, leaving a clear product free of acidic materials. By using a stoichiometric amount of anhydrous ammonia instead of using the conventional solution of alkali metal hydroxide for neutralization, formation of emulsions is avoided and contact of the product with the anhydrous ammonia is easily obtained by virtue of the fact that the anhydrous ammonia is readily soluble in the hydrocarbon product. Thus, the added ammonia complexes with the active catalyst and any aluminum chloride complex and becomes insoluble and separates from the product by decantation or by filtration, as stated before.

In the practice of the present invention, the amount of catalyst should be carefully controlled such that a small amount of active catalyst is always present since otherwise there may be a tendency of the complex to precipitate from the reactants.

It has been found that with dry feed stocks, 0.2 percent by weight of aluminum chloride, with proper mixing and with the proper amount of propylene, the formation of the isomers of the various homologues of isopropyl benzene in high purity results. Thus, the most desirable diisopropyl benzenes are the meta and para isomers with the para isomer being of greatest importance. In order to obtain the p-diisopropyl benzene, short contact time, low temperature, and low conversions are preferred. For example, a contact time of about 2 hours at a temperature of about 80° F. and a conversion of about 30 percent are employed. The contact time may be determined by the rate at which propylene is added and by the efficiency of heat removal. Thus, temperatures below 100° F. are preferred for obtaining high selectivities to the para isomer. Temperatures as high as 200° F. may be used with good results. When three mols of propylene are added per mol of benzene, triisopropyl benzenes are obtained. This reaction may be carried out at 100° to 150° F. and an appreciable amount of the 1,2,4-triisopropyl benzene isomer is obtained whereas if temperatures in the range of 175° to 200° F. are used, this 1,2,4 isomer is converted to the symmetrical 1,3,5 form which is the one most desired from a chemical manufacturing viewpoint.

Tetraisopropyl benzene, which results with the reaction of four mols of propylene per mol of benzene, may be obtained in several different ways. When triisopropyl benzene is produced at 200° F., it has been found that all of the benzene is alkylated to triisopropyl benzene before any of the tetra compound is produced, but the resultant triisopropyl benzene will add one more mol of propylene and yield up to 55 percent of tetraisopropyl benzene. Tetraisopropyl benzene may be recovered from the product of crystallization techniques or preferably may be distilled after the triisopropyl benzene is distilled away. The second procedure is obtaining the tetraisopropyl benzene through alkylation at low temperatures which favor the tetra formation. For example, in alkylation at 50° F., a product may be obtained where the di, tri, and tetra compounds are each present in about 25 volume percent. This product may be cooled and the tetraisopropyl benzene crystallized out of solution and the chilled solution is then filtered to obtain high purity tetraisopropyl benzene having a melting point of 241° F.

In the practice of the present invention, it is to be pointed out that all of these products may be made simultaneously or the conditions may be controlled whereby a selected isopropyl benzene is produced. While in the practice of the present invention neither catalyst nor sludge is recycled, the isopropyl benzene, which is not desired as the principal product, may be recycled with the result that only one product is ultimately removed and recovered.

The present invention in operating on a once-through basis employing only a small amount of catalyst with dried feed stocks and employing anhydrous ammonia to remove catalyst and any reaction products has a number of inherent advantages. Operation with a small amount of catalyst and without hydrogen chloride decreases operating costs, minimizes corrosion, and decreases degradation products, indane formation, and suppresses the formation of sludge, completely eliminating the usual sludge disposal problem ordinarily encountered when employing aluminum chloride catalyst. The present invention is therefore quite advantageous and useful.

The invention will be further illustrated by reference to the drawing in which

FIG. 1 is a flow diagram of a preferred mode; and

FIG. 2 is a plot of data showing the effect of water concentration on operations.

Referring now to the drawing, numeral 11 designates a feed line by way of which a wet benzene feed is introduced to the system from a source, not shown, and is flowed through a drying zone 12 which suitably may contain a bed 13 of anhydrous calcium chloride. The dried feed flows by way of line 14 and is then passed at least in part by branch line 15 controlled by valve 16 through an aluminum chloride saturating drum 17 containing a bed 18 of anhydrous aluminum chloride. On passage of the dried benzene feed through the bed of aluminum chloride, the aluminum chloride dissolves in the dried benzene feed to the extent desired and a solution of aluminum chloride and benzene is withdrawn by line 19 for discharge into reaction zone 20.

The propylene feed is introduced by way of line 51 into a drying zone 22 which, similar to drying zone 12, contains a bed 23 of anhydrous calcium chloride. As a result of this drying operation, dry propylene is discharged from zone 22 by line 23a for discharge into reaction zone 20 by way of manifold lines 24, 25, and 26 controlled, respectively, by valves 27, 28, and 29.

It is to be understood that drying zones 12 and 22 may be other types of driers such as those containing adsorbent materials such as activated alumina and other drying materials or driers 12 and 22 may be distillation towers for removal of moisture. Reaction zone 20 in this particular instance may suitably be a packed tower having a packed section 21 which may be comprised of bell cap trays and the like or may be packed with Berl saddles or other packing materials to assure intimate contact. The aluminum chloride solution in line 19 may have admixed therewith any of the dry benzene which by-passes saturator 18 by flowing the by-passed material by way of line 14 controlled by line 30.

As a result of alkylation conditions in zone 20, an alkylated product is obtained which discharges from reaction zone 20 by way of line 31. This product contains a small amount of hydrogen chloride, unreacted aluminum chloride, and possibly a small amount of dissolved aluminum chloride reaction products. However, the product is a clear solution and there is no phase separation. In order to neutralize any acidic materials, there is added by way of line 32 controlled by valve 33 a stoichiometric amount of anhydrous ammonia which dissolves in the product introduced to line 32 by line 31 and causes neutralization of the acidic material. The neutralized product is then flowed by line 32 into a separation zone 34 which may be provided with a boot 35 for separation of neutralized products which are withdrawn by line 36. The neutralized hydrocarbon product is withdrawn from zone 34 by line 37 and may be introduced into filtration zone 38 on opening valve 39 for further separation of any neutralized products therefrom which may be discharged by line 40 with the filtered hydrocarbon being withdrawn by line 41 and discharged into line 42. It may be desirable to by-pass zone 38 and in these conditions valve 39 would remain closed and valve 43 in line 42 would be open, allowing the hydrocarbon to flow by line 37 directly into line 42 for recovery and subsequent distillation to separate the several isopropyl benzenes from each other. While distillation is mentioned as a separation technique, other separation procedures may be used such as crystallization alone or in combination with distillation.

In order to illustrate the present invention further, a number of runs was performed employing propylene of varying purity which, in several instances, had been dried to a water content of no more than 15 p.p.m. Likewise, benzene and isopropyl benzene were employed with comparative runs being made with the benzene containing substantial quantities of water.

The alkylation operations were conducted in the present invention under the conditions and with the results shown in Table I.

In runs 147 and 148 shown in Table I using high water content propylene, and benzene, aluminum chloride was added in increments of .8 weight percent aluminum chloride. In these operations, high activities were shown for thirty minutes, after which reaction decreased rapidly to essentially no reaction at the end of two hours. A second increment of .8 weight percent of aluminum chloride restored efficient alkylation for a two-hour period, after which activity again dropped to nearly 0. Three additional increments of catalyst were added with each successive addition following a one-hour active period. This indicated a cumulative poisoning effect from leaving the inactive catalyst in the reaction zone.

A second operation was performed with propylene after drying to 84 p.p.m. of water content with the propylene being dried by passing it through a calcium chloride drying tower. The aluminum chloride was again added incrementally in amounts of .8 weight percent and by virtue of the lowered water content of the propylene, activity was shown for slightly more than three hours with

TABLE I

*Propylene Alkylation of Benzene*

[Conditions: Batch, stirred reactions—Volume of benzene, 500 volumes]

| Experiment No. | 147 | 148 | 154 | 155 | [1] 156 | 157 | 158 | 159 | 160 | 168 | 169 |
|---|---|---|---|---|---|---|---|---|---|---|---|
| Temperature, °F | 200 | 200 | 190 | 195 | 195 | 200 | 250 | 200 | 200 | [2] 200 | [2] 200 |
| Time, Hours | 9.0 | 6.6 | 7.0 | 3.5 | 3.5 | 9.3 | 9.0 | 6.0 | 6.0 | 1 | 3 |
| Propylene Purity, percent | 72 | 72 | 72 | 72 | 72 | 72 | 72 | 99.9 | 99.9 | 99.9 | 99.9 |
| Water Content of Propylene, p.p.m. | 600 | 84 | 15 | 15 | 15 | 15 | 15 | 14 | 14 | 14 | 14 |
| Water Content of Benzene, p.p.m. | 44 | 44 | 8 | 8 | 8 | 8 | 8 | 8 | 8 | 5 | 5 |
| AlCl$_3$ Weight Percent Benzene Basis | 4.0 | 1.8 | 0.23 | 0.12 | 0.12 | 0.23 | 0.23 | 0.23 | 0.23 | 0.21 | 0.21 |
| Alkylate Volume/Benzene | 1.8 | 2.1 | 2.5 | 1.7 | 1.5 | 2.7 | 2.9 | 2.9 | 2.9 | 1.3 | 1.4 |
| Composition of Alkylate, Vol. Percent: | | | | | | | | | | | |
| Benzene | | | | 6.9 | 20.5 | | | | | | 0.7 |
| Isopropylbenzene | | 0.6 | 0.7 | 19.3 | 28.9 | 0.4 | | | | 16.4 | 3.0 |
| Diisopropylbenzene | | 4.7 | 4.0 | 29.9 | 12.3 | 2.1 | 1.0 | | 0.3 | 43.9 | 29.7 |
| C$_{13}$-C$_{16}$ Benzene | 0.5 | 0.3 | 0.2 | 0.3 | | 0.5 | 0.4 | | | 0.5 | 1.3 |
| Triisopropylbenzene | 68.0 | 67.5 | 65.3 | 36.3 | 32.6 | 56.5 | 45.5 | 58.1 | 56.5 | 35.0 | 64.4 |
| C$_{17}$ Benzene | | | | | | 0.4 | 0.9 | | | | |
| Tetraisopropylbenzene | 24.4 | 23.7 | 26.6 | 5.0 | 3.9 | 35.2 | 38.7 | 39.1 | 39.5 | 4.2 | 0.9 |
| Indanes— | | | | | | | | | | | |
| C$_{12}$ | | | | 0.2 | 0.2 | | | | | | |
| C$_{15}$ | 1.1 | 1.2 | 2.0 | 0.9 | 0.7 | 0.4 | | | | | |
| C$_{18}$ | 5.5 | 2.2 | 1.2 | 1.0 | 0.6 | 3.5 | 11.5 | 2.8 | 3.7 | | |
| C$_{21}$ | 0.5 | | | | | | 1.6 | | | | |

[1] Anhydrous hydrogen chloride added with propylene.
[2] Isopropylbenzene alkylated in 168 and 169.

the drop-off then being experienced like in the other run. In this operation, two increments of catalyst addition were comparable to that obtained with 4% of catalyst in the run with the high-water-content propylene.

In a third run, which is run 154, the propylene was dried to 15 p.p.m. and the benzene was dried to 8 p.p.m. With 0.23 weight percent of aluminum chloride, results were obtained comparable to those obtained with eighteen times the amount of catalyst employed with the high water content feed stock. Comparing run 154 with runs 147 and 148, it will be seen that the indanes content of run 147 was substantially higher than that of run 154 and that the activity of the catalyst in run 154 was substantially higher than that in both runs 147 and 148. The data from these runs are shown graphically in FIG. 2, which illustrates the beneficial result obtainable in the practice of the present invention.

Referring again to Table I, runs 155 and 156 illustrate the effect of hydrogen chloride on operations such as conducted here. Run 155 was in accordance with the present invention without hydrogen chloride whereas in run 156, 0.01 mol of hydrogen chloride was added. It is apparent that any effect of the hydrogen chloride was detrimental in that less propylene was added, as reflected by the amount of diisopropyl benzene, triisopropyl benzene, and tetraisopropyl benzene formed.

In order to illustrate the effect of temperature, comparative runs were made which are also illustrated in Table I as runs 157 and 158. It will be clear that when a temperature of about 200° F. is exceeded, detrimental results are obtained even with the dried feed stocks in that indane production is increased and the amount of triisopropyl benzene formed is decreased.

In runs 159 and 160, the effect of hydrogen is demonstrated. In run 159, no hydrogen was present with the dried feed whereas with run 160, 0.01 mol of hydrogen was used. The data indicate identical catalyst life, yield, and composition with the indane formation being higher in the product where hydrogen was present. An analysis of the residue gas showed no hydrogen in this run with slightly more than usual amounts of propane, indicating that hydrogen added to the propylene under the conditions employed was not effective in preventing indane formation. Thus, hydrogen, which in the prior art is considered beneficial, actually is detrimental in the practice of the present invention.

The present invention may be practiced employing isopropyl benzene as illustrated by runs 168 and 169 where isopropyl benzene was employed instead of benzene. By employing isopropyl benzene, indane formation may be entirely suppressed and substantial yields of di- and triisopropyl benzene obtained.

It will be clear from the description taken with the drawing and the several examples that a new and improved process has been devised wherein sludge formation is substantially eliminated and desired products obtained using small amounts of aluminum chloride catalyst with dried feed stocks. In other words, an improved and efficient alkylation operation for producing isopropyl benzene has been devised.

The nature and objects of the present invention having been completely described and illustrated, what we wish to claim as new and useful and secure by Letters Patent is:

1. A method for producing isopropyl benzenes which comprises charging a solution consisting of about 0.1 to about 0.5 percent by weight of anhydrous aluminum chloride and an aromatic hydrocarbon selected from the group consisting of isopropyl benzene and benzene containing no more than 15 p.p.m. of water to a reaction zone free of aluminum chloride sludge, adding to said reaction zone an alkylation amount of propylene also containing no more than 15 p.p.m. of water while maintaining said reaction zone under alkylation conditions including a temperature in the range from 50° to 200° F. to form a clear product containing isopropyl benzenes and free of aluminum chloride sludge, and recovering said product.

2. A method of producing isopropyl benzenes which comprises charging a solution consisting of about 0.1 to about 0.5 percent by weight of anhydrous aluminum chloride and an aromatic hydrocarbon selected from the group consisting of ispropyl benzene and benzene containing from about 5 to 15 p.p.m. of water to a reaction zone free of aluminum chloride sludge, adding to said reaction zone an alkylation amount of propylene also containing from about 5 to 15 p.p.m. of water while maintaining said reaction zone under alkylation conditions including a temperature in the range from 50° to 200° F. to form a clear product containing isopropyl benzenes and free of aluminum chloride sludge, and recovering said product.

3. A method in accordance with claim 1 in which the aromatic hydrocarbon is benzene.

4. A method in accordance with claim 1 in which the aromatic hydrocarbon is isopropyl benzene.

5. A method for producing isopropyl benzenes which comprises charging a solution consising of about 0.1 to about 0.5 percent by weight of anhydrous aluminum chloride and an aromatic hydrocarbon selected from the group consisting of isopropyl benzene and benzene containing no more than 15 p.p.m. of water to a reaction zone free of aluminum chloride sludge, adding to said reaction zone an alkylation amount of propylene also containing no more than 15 p.p.m. of water while maintaining said reaction zone under alkylation conditions including a temperature in the range from 50° to 200° F. to form a clear product containing isopropyl benzenes and free of aluminum chloride sludge, neutralizing said product with anhydrous ammonia, and recovering said neutralized product.

6. A method for producing isopropyl benzenes which comprises separately drying an aromatic hydrocarbon selected from the group consisting of isopropyl benzene and benzene and propylene to form separate substantially dry streams each containing no more than 15 p.p.m. of water, forming a solution consisting of about 0.1 to about 0.5 percent by weight of anhydrous aluminum chloride and said dried aromatic hydrocarbon stream, charging said solution to a reaction zone maintained free of aluminum chloride sludge and under alkylation conditions including a temperature in the range from 50° to 200° F., adding to said reaction zone an alkylation amount of said dried propylene stream to form a clear product containing isopropyl benzenes and free of aluminum chloride sludge, and recovering said product.

7. A method for producing isopropyl benzenes which comprises separately drying an aromatic hydrocarbon selected from the group consisting of isopropyl benzene and benzene and propylene to form separate streams each containing no more than 15 p.p.m. of water, forming a solution consisting of about 0.1 to about 0.5 percent by weight of anhydrous aluminum chloride and said dried aromatic hydrocarbon stream, charging said solution to a reaction zone maintained free of aluminum chloride sludge and under alkylation conditions including a temperature in the range from 50° to 200° F., adding to said reaction zone an alkylation amount of said dried propylene stream to form a clear product containing isopropyl benzenes and free of aluminum chloride sludge, neutralizing said product with anhydrous ammonia, and recovering said product.

8. A method for producing isopropyl benzenes which comprises separately drying an aromatic hydrocarbon selected from the group consisting of isopropyl benzene and benzene and propylene to form separate streams each containing from about 5 to 15 p.p.m. of water, forming a solution consisting of about 0.1 to about 0.5 percent by weight of anhydrous aluminum chloride and said dried aromatic hydrocarbon stream, charging said solution to a reaction zone maintained free of aluminum chloride sludge and under alkylation conditions including a temperature in the range from 50° to 200° F., adding to said reaction zone an alkylation amount of said dried propylene stream to form a clear product containing isopropyl benzenes and free of aluminum chloride sludge, and recovering said product.

9. In the alkylation with propylene of an aromatic hydrocarbon chosen from the group consisting of isopropyl benzene and benzene, the improvement which comprises conducting said alkylation reaction in the presence of less than 15 p.p.m. of water while utilizing as a catalyst aluminum chloride in solution in said aromatic hydrocrabon and in the absence of aluminum chloride sludge in amounts from about 0.1 to about 0.5 percent by weight based on the aromatic hydrocarbon.

References Cited in the file of this patent

UNITED STATES PATENTS

| | | |
|---|---|---|
| 2,498,567 | Morris et al. | Feb. 21, 1950 |
| 2,778,862 | Gorham | Jan. 22, 1957 |
| 2,817,688 | Enos | Dec. 24, 1957 |
| 2,864,874 | Enos | Dec. 16, 1958 |
| 2,943,118 | Cahn et al. | June 28, 1960 |